March 13, 1962 H. BROOKS 3,025,493
BALANCED INPUT CIRCUIT
Filed Dec. 28, 1951 4 Sheets-Sheet 1
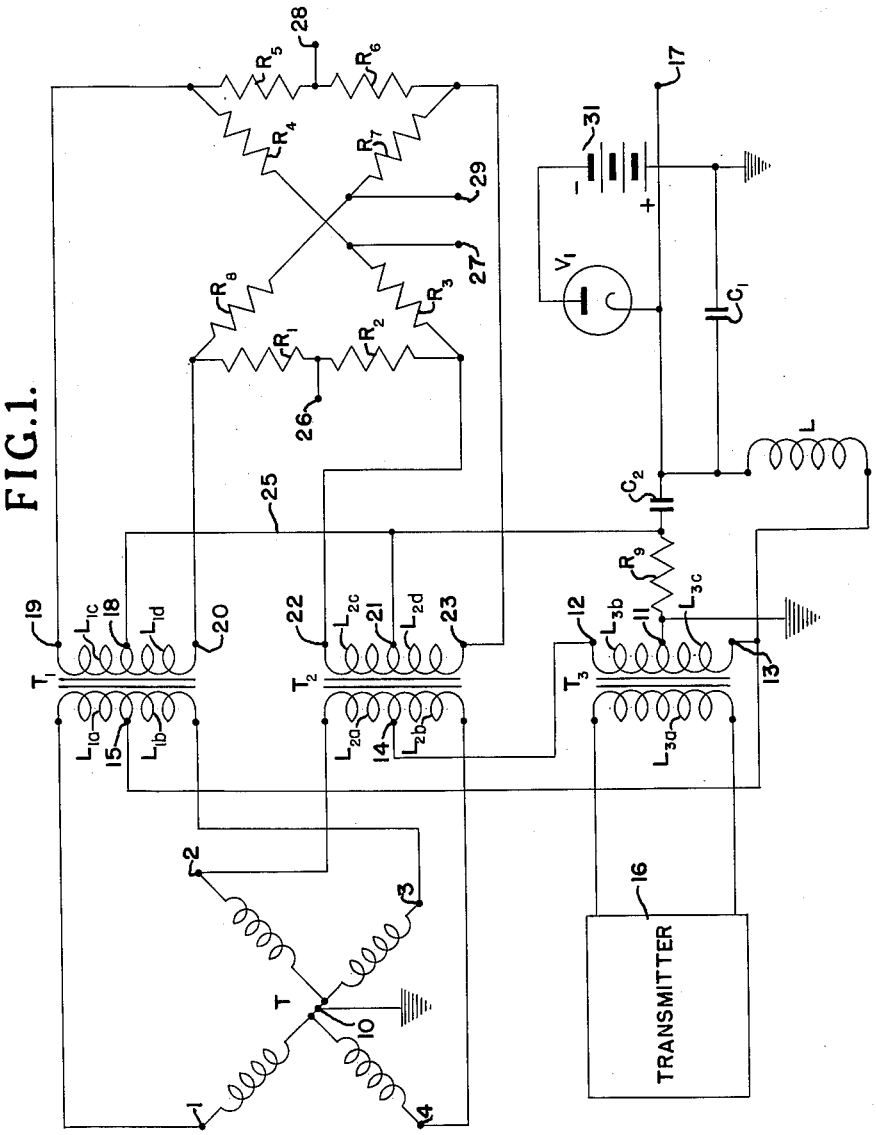
INVENTOR.
HARVEY BROOKS
BY
R. M. Hicks ATTYS.

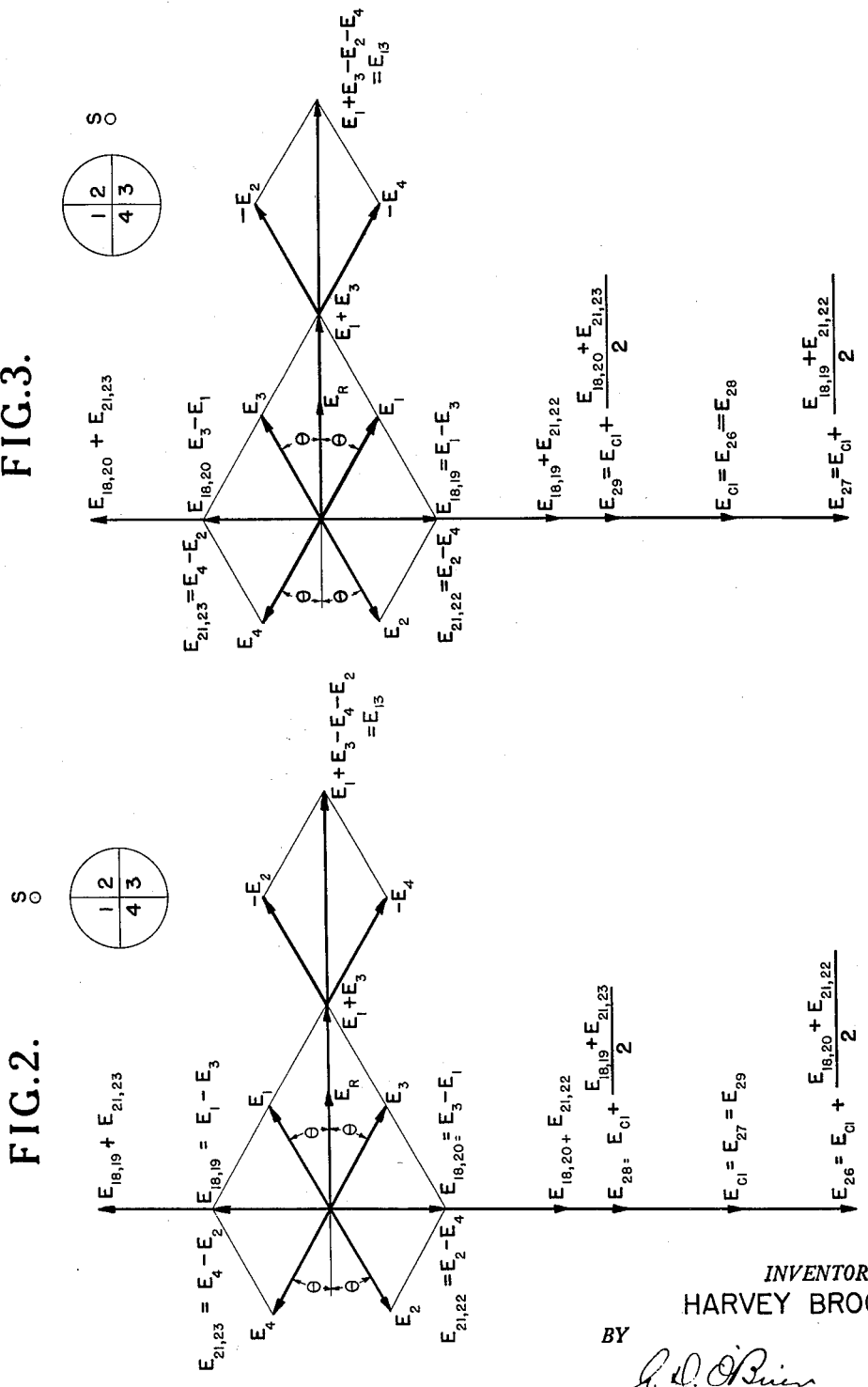

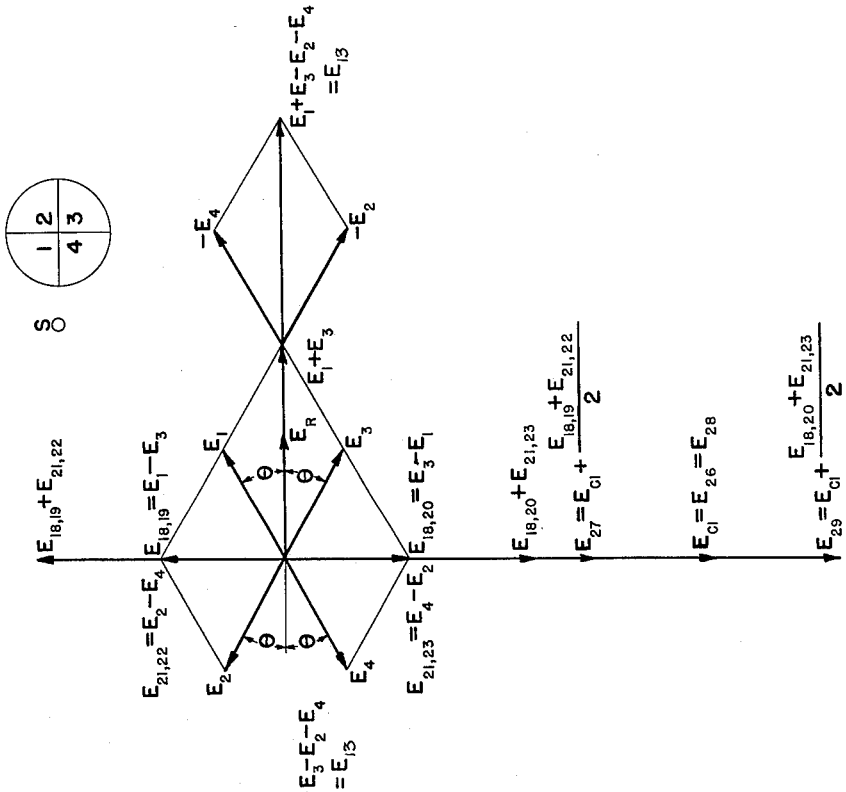
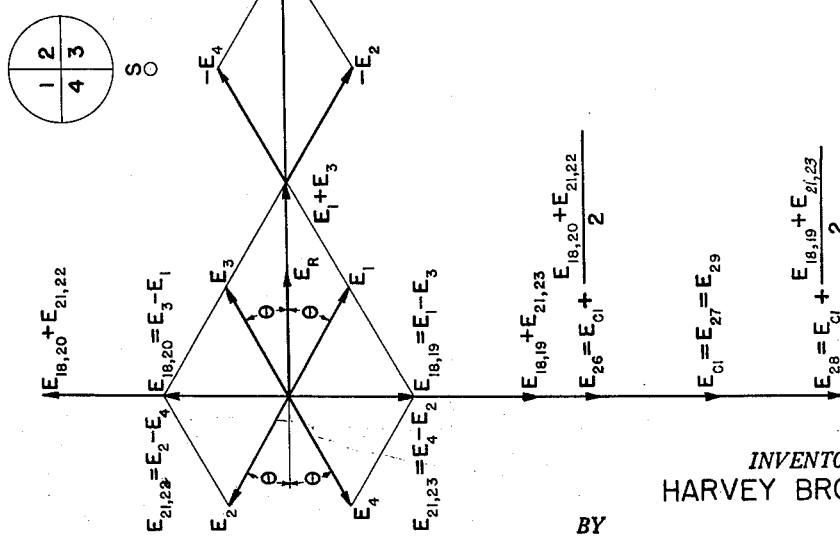

March 13, 1962 H. BROOKS 3,025,493
BALANCED INPUT CIRCUIT
Filed Dec. 28, 1951 4 Sheets-Sheet 4

INVENTOR.
HARVEY BROOKS
BY
*A. D. O'Brien*
*R. M. Hicks* ATTYS.

United States Patent Office 3,025,493
Patented Mar. 13, 1962

3,025,493
BALANCED INPUT CIRCUIT
Harvey Brooks, Cambridge, Mass., assignor to the United States of America as represented by the Secretary of the Navy
Filed Dec. 28, 1951, Ser. No. 263,807
2 Claims. (Cl. 340—6)

This invention relates generally to a directional receiver and transmitter circuit and more particularly pertains to a transmit-receive circuit which may be used in conjunction with an echo-ranging system, such, for example, as that disclosed and claimed in the copending application for an Echo Ranging Torpedo, Serial Number 305,432, filed August 20, 1952 by Harvey Brooks and Arthur N. Butz, Jr.

In the echo ranging type homing device, as disclosed in the above mentioned application, pulses of high frequency energy are transmitted to the surrounding medium, in this instance a body of water, by an electromechanical transducer, at spaced transmission times separated by listening intervals. During the listening intervals, the acoustic energy incident on the transducer comprises reverberation, and echoes from an underwater target, the predominant frequency of the former differing from the transmission frequency by an amount dependent on the speed of the device, and the echoes having a frequency which differs from the frequency of reverberation by an amount known as target doppler.

The circuit of the present invention makes possible the use of a single quadrantally split transducer for transmission of acoustic signals and for the reception of the reverberation and target echoes produced thereby, the circuit arrangement being such that constant electrical connection can be maintained between the transmitter and transducer, and between the same transducer and receiver, without excessive energy loss in the receiver during transmission, or excessive energy loss in the transmitter during reception. In transmission, the quadrantal sections of the transducer are so energized that all sections vibrate in phase and transmit a directional acoustic signal to the surrounding medium, and during reception the incoming signals due to reverberation and target echoes generate voltages in the quadrantal sections. The voltage outputs of all quadrantal sections are combined to produce a reference voltage, of amplitude corresponding to target echo intensity, utilized as a carrier voltage in derivation of output signals which define target direction, and further utilized to provide a signal for the doppler enablement channel of an echo ranging torpedo, as in the above mentioned copending application, to enable actuation of the steering mechanism only when the target echo frequency differs from the reverberation frequency by a predetermined amount. As disclosed in the aforementioned copending application, the frequency of reverberation is detected by the transducer during the reverberation sampling period which occurs after each transmitted pulse and prior to the reception by the transducer of the target echoes, the frequency of the target echoes being compared to the reverberation frequency in the doppler enablement channel.

The circuits of the present invention in effect provide two pairs of target detection or steering lobes (extending forwardly of the torpedo in mutually perpendicular planes through the transducer axis), for these circuits yield two pairs of output signals having relative amplitudes which define target direction, for the operation of two pairs of relatively perpendicular sets of control surfaces on the torpedo, whereby torpedo steering is under full acoustic control and the homing trajectory of the torpedo is unaffected by roll thereof. This permits the torpedo to attack at high climb and dive angles, since the roll of the torpedo, due to inadequate torque compensation in such attitudes, does not effect the steering.

More specifically, the voltages due to target echoes at each of the quadrantal sections of the transducer are phase shifted relative to the reference voltage in a direction and to an extent dependent on the angular deviation of the target direction from the transducer axis, the voltage output of each quadrantal element thus generally having a component which is in quadrature with the reference voltage and of an amplitude corresponding to the displacement of the target direction from the transducer axis. Provision is made in the circuit of the present invention for deriving the algebraic differences between the voltages appearing in diagonally opposite quadrants to produce pairs of opposedly phased intermediate voltages proportional to the sum of the quadrature voltages induced in diagonally opposite quadrants, the sense of which oppositely phased voltages is determined by the orientation of the target relative to the transducer axis. Provision is further made for combining each of the opposedly phased intermediate voltages with a voltage proportional to the reference voltage, which is in phase or in phase opposition with the intermediate voltages depending on the sense of the latter, to produce four control voltages, the amplitude of each of which is thus dependent on the sense and amplitude of the intermediate voltage combined therewith. Each of the control voltages produced by one pair of diagonally opposite quadrants is combined with each of the control voltages produced by the other pair of diagonally opposite quadrants, in a manner to effect a determination of the phase shift between the upper and lower halves of the transducer and produce up and down signals having relative amplitudes dependent on the sense of the phase shift, and to similarly determine the phase shift between the right and left halves of the transducer and produce right and left signals having relative amplitudes dependent on the sense of the phase difference therebetween. Thus, the direction of incidence of the received acoustic energy is defined by the relative amplitudes of the up, down, right and left signals, providing the basic information necessary for the control system.

An important object of this invention is to provide a transmitting and receiving circuit for applying electrical energy to a transducer during transmission, and for utilizing voltages due to target echoes induced in the transducer during reception to determine the orientation of the target relative to the transducer.

Another object of the invention is to provide a means for maintaining constant electrical connection between a transducer and a transmitter, and between the same transducer and receiver without causing excessive loss of energy in the receiver when transmitting or causing excessive loss of energy in the transmitter when receiving.

A further object of the invention is to provide an input circuit which, when used in conjunction with a quadrantally split transducer, provides simultaneous comparisons of the phase difference between the sum of the voltages generated in any two adjacent quadrants and the sum of the voltages generated in the remaining quadrants.

Still another object of this invention is to provide an input circuit which is particularly adapted for use with low impedance transducers by combining, in a single step, the step-up transformation to grid impedance and the production of steering lobes by means of phase shift.

Yet another object of this invention is to provide an input circuit for an echo ranging system of the type which distinguishes between echoes from moving targets and the echoes from stationary targets by the difference in doppler frequency, which input circuit provides a reference voltage of a frequency equal to the mean frequency of reverberation from the surrounding medium.

These, together with other ancillary objects and advantages will become more fully apparent from the following description, when considered in connection with the accompanying drawings wherein:

FIG. 1 is a schematic diagram of a preferred embodiment of the input circuit for an echo-ranging system;

FIGS. 2, 3, 4, 5 and 6 are diagrams indicating various positions of the target relative to the transducer, and the resultant relationship of voltages produced.

Figure 7:
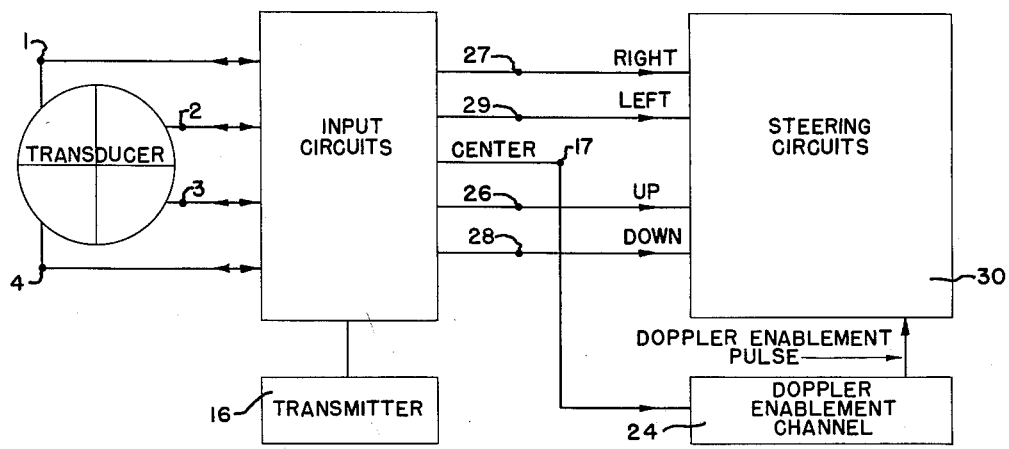
FIG. 7 is a block diagram of an echo ranging system incorporating the input circuits of the present invention.

For the purpose of facilitating the description of the invention, it is assumed that the active face of the quadrantally split transducer lies in fixed orientation in a vertical plane, and that the transducer has an axis normal to the face thereof and passing through its center, which axis is hereinafter referred to as the transducer axis. The direction of the target source of echoes is conveniently measured in terms of angular deviation of the target direction from the transducer axis, this deviation being measured in terms of the component deviations in horizontal and vertical planes extending through the transducer axis.

The transducer T comprises a number of elements electrically connected to form four sections or quadrants numbered 1, 2, 3 and 4, one terminal of each quadrant being joined as at 10 to a common point at ground potential, while the remaining terminal of each quadrant is identified by the number of the quadrant. The ungrounded terminals of diagonally opposite quadrants 1 and 3 are connected by the primary windings $L_{1a}$ and $L_{1b}$ of transformer $T_1$, and the ungrounded terminals of diagonally opposite quardants 2 and 4 are connected by the primary windings $L_{2a}$ and $L_{2b}$ of transformer $T_2$. The secondary windings $L_{3b}$ and $L_{3c}$ of transformer $T_3$ are connected at a common point 11, at ground potential, the terminals 12 and 13 of the secondary windings $L_{3b}$ and $L_{3c}$ being respectively connected to center taps 14 and 15 on the primaries of transformers $T_1$ and $T_2$.

During transmission the transmitter 16 supplies energy to the primary $L_{3a}$ of transformer $T_3$, energy from the secondary windings $L_{3b}$ and $L_{3c}$ being applied through the primary windings $L_{1a}$, $L_{1b}$, $L_{2a}$ and $L_{2b}$ of the transformers $T_1$ and $T_2$ to the four quadrants of the transducer. As is apparent from the drawings, during transmission the potentials (with respect to ground) of the terminals 12 and 13 of secondary windings $L_{3b}$ and $L_{3c}$ are 180° out of phase, and consequently the currents in quadrants 1 and 3 of the transducer are 180° out of phase with the currents in quadrants 2 and 4. However, the quadrantal sections 1, 2, 3 and 4 are so commutually disposed, as indicated by the counterclockwise winding of quadrantal elements 1 and 3 and by the clockwise winding of quadrantal elements 2 and 4, and are so interconnected, as indicated by the common ground at 10, that all elements vibrate in phase when adjacent quadrants are energized 180° out of phase, whereby the transducer transmission pattern is symmetrical about the transducer axis. Also due to this arrangement, when the transducer elements are energized by an acoustic source on the transducer axis, the voltage generated at the terminals of each quadrant is 180 degrees out of phase with the voltages generated at the terminals of adjacent quadrants. Further, the primary windings $L_{1a}$ and $L_{1b}$ of transformer $T_1$, and the primary windings $L_{2a}$ and $L_{2b}$ of transformer $T_2$ have a high coefficient of coupling, thereby causing negligible voltages to be induced in the secondary windings of these transformers due to the excitation of the two primary windings of each of the transformers in phase opposition, as occurs during transmission, and consequently causing negligible power loss in the circuits connected to the secondary windings under those conditions.

As hereinbefore mentioned, the quadrantal elements are so connected that when adjacent quadrants are energized 180° out of phase, all elements vibrate in phase, and consequently during reception when the transducer elements all vibrate in phase, as when energized by an acoustic source on the transducer axis, the voltage generated in each quadrant is 180° out of phase with the voltages generated in the adjacent quadrants. Thus, the voltages generated by quadrants 1 and 3 are in phase with each other and 180° out of phase with the voltages generated by quadrants 2 and 4, when the transducer is energized by acoustic energy from a source on the transducer axis. However, when the source of acoustic energy striking the transducer lies to one side of the transducer axis, the phase relationships among the four input voltages differs from that set forth above, the voltage from a quadrant nearer the sound source being advanced in phase and the voltage from a quadrant farther from the sound source being retarded in phase, relative to the reference voltage.

FIGS. 2, 3, 4, 5 and 6 are vector diagrams of the voltage outputs of the transducer quadrants and the voltages produced in the input circuit, for different locations of the sound source S, the relative location of the sound source being indicated in each diagram. The voltage vector $E_R$ in each case represents a phase reference voltage, the voltage vectors $E_1$, $E_2$, $E_3$ and $E_4$ respectively representing the relative phase and magnitude of the voltages generated in quadrants 1, 2, 3, and 4 when the sound source is off-axis as shown.

Figure 6:
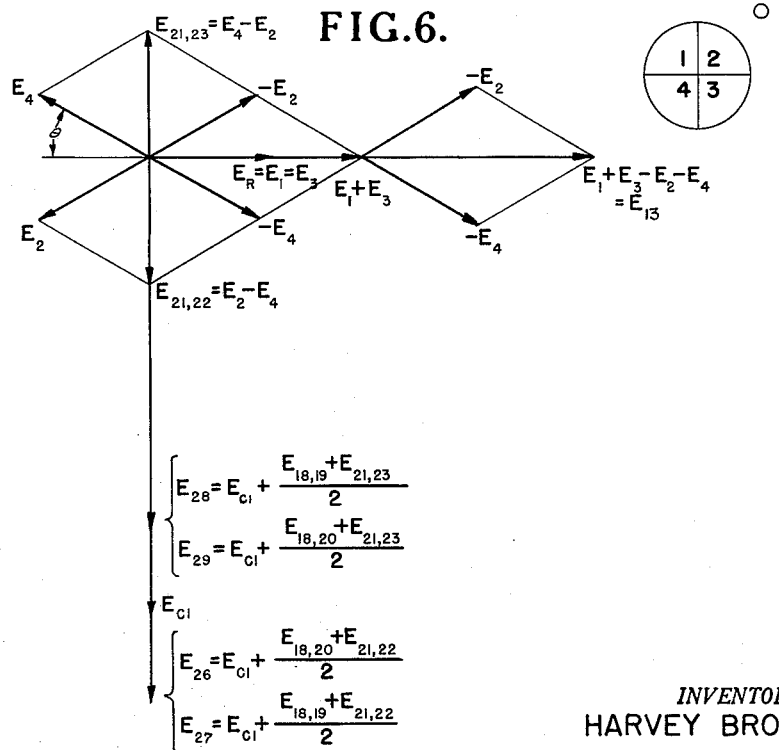

Referring to FIGS. 2, 3, 4 and 5, the angle $\theta$ is the phase shift introduced in the quadrantal voltages due to angular deviation of the sound source from the transducer axis in the indicated horizontal or vertical direction, and the angle $\theta$ in FIG. 6 is the phase shift introduced only in each voltage of one pair of diagonally opposite quadrants, in this instance quadrants 2 and 4, when the sound source is so orientated relative to the transducer axis as to have equal horizontal and vertical component deviations. In any general case the phase angles of the vector voltages $E_1$, $E_2$, $E_3$ and $E_4$ relative to the voltage $E_R$ vary in sense and magnitude in accordance with the direction and amplitude of the horizontal and vertical components of the angular deviation of the sound source from the transducer axis.

During reception, the voltages $E_1$ and $E_3$ induced in the respective diagonally opposite quadrants are in effect summed at terminal 15 of transformer $T_1$ (also terminal 13 of the secondary of transformer $T_3$), and, similarly, the voltages $E_2$ and $E_4$ are summed at terminal 14 of transformer $T_2$ (also terminal 12 of transformer $T_3$). Since the quadrature components of the voltages induced in diagonally opposite quadrants by a sound source displaced from the transducer axis are in opposing phase relation, the quadrature component of the voltage induced in the quadrant nearer the sound source leading the voltage $E_R$, and the quadrature component of the voltage induced in the quadrant farther from the sound source lagging the voltage $E_R$, it is deemed apparent that the quadrature components cancel, and the voltages effective across $L_{3b}$ and $L_{3c}$ are each proportional to the components which extend along the line of voltage $E_R$, as is diagrammatically shown in FIGS. 2–6. As the quadrantal elements are so connected that the induced voltages in quadrants 1 and 3 are 180° out of phase with the voltages induced in quadrants 2 and 4, it will be seen that the voltages applied between terminals 12 and 13 and ground, viz. across windings $L_{3b}$ and $L_{3c}$ respectively, are in series aiding relationship, and, due to auto-transformer action and the close coupling between windings $L_{3b}$ and $L_{3c}$, the voltage $E_{13}$ across $L_{3c}$ is a vector summation of the voltages induced in the transducer sections, which may be expressed as:

(1) $E_{13} = (E_1 + E_3) + (-E_2 - E_4) = E_1 + E_3 - E_2 - E_4$

This voltage may be utilized to indicate target presence, or as a meansure of target echo intensity, or to provide a signal for doppler enablement such as detailed in the aforementioned copending application for Echo Ranging Torpedo, in addition to being utilized as a component in the production of up, down, right and left target signals having relative amplitudes dependent upon target direction, as is more fully set forth hereinafter.

An inductor L and a capacitor $C_1$ are connected in series across winding $L_{3c}$ and operate near series resonance at the transmission frequency. For this condition the voltage across $C_1$ is in approximately 90° lagging phase relation with the driving voltage $E_{13}$ from $L_{3c}$, and hence with $E_R$. The voltage $E_{c1}$ across $C_1$ is therefore in phase quadrature with the reference voltage $E_R$ and its magnitude is greater than $E_{13}$ the sum of the transducer output voltages, by a factor dependent on the Q of the inductor L, the Q of the inductor L preferably being of the same order of magnitude as the turns ratio $n$ of the transformers $T_1$ and $T_2$. This voltage $E_{c1}$ across $C_1$ is applied via terminal 17 to the doppler enablement channel 24, as diagrammatically shown in FIG. 7, for control purposes in accordance with its magnitude (substantially proportional to target echo intensity) and its target doppler frequency difference, as detailed in the aforementioned application for Echo Ranging Torpedo.

In the vector diagrams shown in FIGS. 2–6, the turns ratio $n$, and the Q of the inductor are for convenience taken equal to 1. However, in practice the actual turns ratio, and consequently the Q of the inductor L, will be determined by the step-up ratio necessary to match the impedance of the transducer to the input impedance of the signal amplifiers connected thereto, which may be conventional but preferably of the type described in the aforementioned copending application.

As is evident by inspection of the schematic circuit shown in FIG. 1, the transducer voltages $E_1$, $E_2$, $E_3$ and $E_4$ as applied to transformers $T_1$ and $T_2$ result in development of difference voltages at the transformer secondaries. When the coefficients of coupling between the windings of transformer $T_1$ and between the windings of transformer $T_2$ are large, the induced voltages in the secondary windings $L_{1c}$, $L_{1d}$ of transformer $T_1$, viz., between the terminals 18, 19 and terminals 18 and 20 respectively, and the induced voltages in the secondary winding $L_{2c}$, $L_{2d}$ of transformer $T_2$, viz., between the terminals 21, 22 and 21, 23 respectively, are given by the vector equations:

(2) $\quad E_{18,19}=(E_1-E_3)n$
(3) $\quad E_{18,20}=(E_3-E_1)n$
(4) $\quad E_{21,22}=(E_2-E_4)n$
(5) $\quad E_{21,23}=(E_4-E_2)n$ Where $n$ is the turns ratio of transformers $T_1$ and $T_2$.

As hereinbefore mentioned, when the sound source S is on the transducer axis, the voltages $E_1$ and $E_3$ are in phase with each other and with the voltage $E_R$, and the voltages $E_2$ and $E_4$ are in phase with each other and in phase opposition with the voltage $E_R$. Since the intermediate voltages $E_{18,19}$, $E_{18,20}$ $E_{21,22}$ and $E_{21,23}$ are proportional to vectorial differences between the induced voltages in diagonally opposite quadrants, it will be appreciated that the intermediate voltages are zero under the above mentioned on-axis condition. However, when the sound source is displaced from the transducer axis, the vector voltages $E_1$, $E_2$, $E_3$ and $E_4$ have components thereof in quadrature with the voltage $E_R$, the voltages induced in the quadrants nearer the sound source having quadrature components which lead the voltage $E_R$, and the voltages induced in the quadrants remote from the sound source having quadrature components which lag the voltage $E_R$. The quadrature components in diagonally opposite quadrants are thus in phase opposition, and the voltages $E_{18,19}$, $E_{18,20}$ and the voltages $E_{21,22}$, $E_{21,23}$ are therefore proportional to vectorial summations of the quadrature components in voltages $E_1$, $E_3$ and voltages $E_2$, $E_4$ respectively as is diagrammatically shown in FIGS. 2–6. Thus, the amplitudes of the intermediate voltages are determined by the angular deviation of the sound source relative to the transducer axis, the sense of the intermediate voltages being determined by the direction of displacement of the sound source from the transducer axis.

The taps 18 and 21 of the secondaries of transformers $T_1$ and $T_2$ respectively are connected together and to the junctions of coupling capacitor $C_2$ and resistor $R_9$, by a conductor 25, thus being placed at a potential (relative to ground) equal to that developed across $R_9$, substantially the same as that across capacitor $C_1$. The voltage $E_{c1}$ across capacitor $C_1$ is coupled by capacitor $C_2$ to the resistor $R_9$, and since the impedance of the capacitor $C_2$ is chosen to be small at the operating frequency of the transducer, the voltage across $R_9$ is approximately equal to the voltage $E_{c1}$ across capacitor $C_1$. The vector potential at taps 18 and 21 of the transformers $T_1$ and $T_2$ is thus either in phase, or in phase opposition with the voltages $E_{18,19}$, $E_{18,20}$, $E_{21,22}$, and $E_{21,23}$, and consequently the relative amplitudes of the resultant potentials at terminals 19, 20, 22 and 23 are dependent on the amplitude and sense of the quadrature components in the transducer sections. For an off-axis target, the voltage at terminal 19 may be either greater or less than the voltage at terminal 20, dependent on the amplitude and sense of the phase difference between the induced voltages $E_1$ and $E_3$, and, similarly, the voltage at terminal 22 may be greater or less than the voltage at terminal 23 dependent on the phase difference between voltages $E_2$ and $E_4$.

Linear combinations of the potentials at terminals 19, 20, 21 and 22 of the secondaries of transformers $T_1$ and $T_2$ are obtained by means of a bridge network, terminals 20 and 22 being connected by series resistors $R_1$ and $R_2$ having a tap 26 therebetween; terminals 19 and 22 being connected by series resistors $R_3$ and $R_4$ having a tap 27 therebetween; terminals 19 and 23 being connected by series resistors $R_5$ and $R_6$ having a tap 28 therebetween; and terminals 20 and 23 being connected to series resistors $R_7$ and $R_8$ having a tap 29 therebetween.

The voltages $E_{26}$, $E_{27}$, $E_{28}$, and $E_{29}$ appearing between output terminals 26, 27, 28 and 29 and ground are proportional to summations of the potentials appearing at terminals 19, 20, 22 and 23 (which in turn are sums made up of the voltage $E_{c1}$ and the difference voltages between either the upper and lower halves or the right and left halves of the transducer), and for purposes of examination and comparison may be expressed as follows:

(6)
$$E_{26}=E_{c1}+\frac{E_{18,20}+E_{21,22}}{2}=E_{c1}+(E_3+E_2-E_1-E_4)\frac{n}{2}$$

(7)
$$E_{27}=E_{c1}+\frac{E_{18,19}+E_{21,22}}{2}=E_{c1}+(E_1+E_2-E_3-E_4)\frac{n}{2}$$

(8)
$$E_{28}=E_{c1}+\frac{E_{18,19}+E_{21,23}}{2}=E_{c1}+(-E_3-E_2+E_1+E_4)\frac{n}{2}$$

(9)
$$E_{29}=E_{c1}+\frac{E_{18,20}+E_{21,23}}{2}=E_{c1}+(-E_1-E_2+E_3+E_4)\frac{n}{2}$$

Because the horizontal component of deviation of the sound source does not affect the phase difference between the voltages $E_2$ and $E_3$ or the phase difference between the voltages $E_1$ and $E_4$, the up/down output voltages $E_{26}$ and $E_{28}$ are not affected by such deviations, and remain equal to $E_{c1}$, as shown in FIGS. 3 and 5. The vertical component of deviation of the sound source causes a relative phase shift between the voltages from the upper and lower transducer quadrants, giving rise to an increase in the voltage $E_{26}$ and a decrease in the voltage $E_{28}$ when the vertical deviation is upward, as shown in FIG. 2. When the vertical deviation is downward, a decrease in the voltage $E_{26}$ and an increase in the voltage $E_{28}$ ensues, as shown in FIG. 4. When the vertical deviation is zero, the voltages $E_{26}$ and $E_{28}$ are each equal to the voltage $E_{c1}$, as is obvious from Equations 6 and 8.

Since the vertical component of deviation of the sound source does not affect the phase difference between the voltages $E_1$ and $E_2$ or between the voltages $E_3$ and $E_4$, the left/right output voltages $E_{27}$ and $E_{29}$ are not affected by such deviations, as is illustrated in FIGS. 2 and 4. The horizontal component of deviation of the sound source causes a relative phase shift between the voltages from the right and left quadrants of the transducer, giving rise to an increase in the voltage $E_{27}$ and a decrease in the voltage $E_{29}$ when the deviation is to the right as shown in FIG. 3. When the horizontal deviation is to the left, an increase in the voltage $E_{29}$ and a decrease in the voltage $E_{27}$ ensues, as shown in FIG. 5. When the horizontal deviation is zero, the voltages $E_{27}$ and $E_{29}$ are each equal to the voltage $E_{c1}$, as shown in FIGS. 2 and 4.

It will thus be appreciated that the relative amplitudes of the voltages $E_{26}$ and $E_{28}$ are a measure of the magnitude and sign of the vertical component of deviation of the sound source, and that the relative amplitudes of the voltages $E_{27}$ and $E_{29}$ are a measure of the horizontal components of deviation of the sound source. More specifically, the voltages $E_{26}$, $E_{27}$, $E_{28}$ and $E_{29}$ respectively produce up, right, down and left signals, which signals may be operated upon and utilized in sonar equipment to indicate target presence and location, or in torpedoes to provide homing action. As shown schematically in FIG. 7, in the described torpedo embodiment this is accomplished by means of steering circuits 30 which are to be understood as including signal amplifiers and converters. While such steering circuits may of course be entirely conventional (since the input signals thereto are simply variable in relative amplitudes in accordance with target direction), the particular system disclosed in the previously mentioned copending application is preferred.

The transmitter is preferably of conventional type wherein the output impedance is much greater when the transmitter is not operating than when the transmitter operates. The transformer $T_3$ is designed to match the impedance of the transmitter to the transducer during transmission, thus insuring maximum power transfer during transmission. However, during reception, the increased output impedance of the transmitter insures that a negligible fraction of the received acoustic energy is dissipated in the transmitter because of the mismatch then existing.

A diode tube $V_1$ and bias voltage 31 are connected in series across the capacitor $C_1$. The bias voltage is made greater than the maximum voltage across $C_1$ anticipated during reception, and thus the tube does not conduct during reception and does not affect the receiving circuit. During transmission, however, the voltage across $C_1$ exceeds the bias voltage 31, causing the tube $V_1$ to conduct, at which time the Q of the circuit composed of L, $C_1$ and $V_1$, is reduced, and the development of excessive voltages across $C_1$ is prevented.

Recapitulating, during transmission energy pulses are supplied by the transmitter 16 to the primary $L_{3a}$ of transformer $T_3$, energy from the secondary windings $L_{3b}$ and $L_{3c}$ being applied through the primary windings $L_{1a}$, $L_{1b}$, $L_{2a}$ and $L_{2b}$ of transformers $T_1$ and $T_2$ to the quadrantal elements of the transducer, whereby quadrants 1 and 3 are energized 180° out of phase with quadrants 2 and 4, but so wired that all elements vibrate in phase. Since the primary windings $L_{1a}$ and $L_{1b}$ of transformer $T_1$ and the primary windings $L_{2a}$ and $L_{2b}$ of transformer $T_2$ are energized in phase opposition during transmission, negligible power loss is incurred in the receiving circuits connected to the secondaries of transformers $T_1$ and $T_2$ and it is consequently not necessary to disconnect the receiver during transmission.

During reception, voltages are induced in the quadrantal elements of the transducer T. When the sound source S is located on the transducer axis, the voltages in quadrants 1 and 3 are in phase with each other, and the voltages in quadrants 2 and 4 are in phase with each other and in phase opposition with the voltages induced in quadrants 1 and 3. As the sound source S becomes displaced from the transducer axis, the voltages in diagonally opposite quadrants become phase shifted relative to each other (except in a special case such as shown in FIG. 6), the voltages induced in the quadrants nearer the sound source being advanced in phase and the voltages induced in quadrants farther from the sound source being retarded.

The voltages appearing at terminals 12, 13 of the secondary of transformer $T_3$ are each a summation of the in-phase components of echo voltages obtained from the diagonal transducer pairs and, due to the close coupling between windings $L_{3b}$ and $L_{3c}$, the voltage across $L_{3c}$ is proportional to a vectorial summation of the voltages in the transducer diagonals, such that it corresponds to target echo intensity. Since the transmitter 16 is chosen to be of conventional type wherein the output impedance is much greater when the transmitter is not operating than when the transmitter operates, and as the transformer $T_3$ is designed to match the impedance of the transmitter to that of the transducer during transmission, it is deemed apparent that the impedance mismatch which exist between the transmitter and transducer during reception insures that a negligible fraction of echo signal will be lost in the transmitter under those conditions. Thus it is not necessary to disconnect the transmitter during reception.

The transformers $T_1$ and $T_2$, in addition to affording a convenient means for connecting the receiving circuit to the transducer in such a manner as to obviate the necessity of disconnecting the receiver during transmission, also provides the necessary step-up ratio to match the relatively low impedance of the transducer to that of the receiver and further provides for the production of voltages proportional to the vector difference between the voltages in diagonally opposite quadrants. These difference voltages between diagonals are combined with a voltage $E_{c1}$, proportional to the voltage appearing across the winding $L_{3c}$ of transformer $T_3$, and shifted 90° in phase relative thereto, whereby there are produced four voltages appearing at terminals 19, 20, 22 and 23, the relative amplitudes of which are indicative of the sense of the difference voltages between diagonally opposite quadrants. For example, when there is a difference voltage between diagonally opposite quadrants 1 and 3 which is in phase with the voltage $E_{c1}$, the potential at terminal 19 is increased above $E_{c1}$ by an amount dependent on the magnitude of the phase difference between the voltages induced in quadrants 1 and 3. Similarly, the potential at terminal 20 will be reduced by an equal amount below $E_{c1}$ since the voltage between quadrants 3 and 1, under the above conditions will be 180° out of phase with the voltage $E_{c1}$. Thus, the voltages appearing at the pair of terminals 19, 20 (and at the pair 22, 23) will either be greater or less than the voltage $E_{c1}$ by an equal amount dependent on the sense of the phase difference between the diagonal quadrant signals from which the said voltages derive.

The bridge network is so connected to the secondaries of transformers $T_1$ and $T_2$ as to produce output signals at the four center-taps of the bridge legs, which signals are averages of each of the control voltages appearing at terminals 19 and 20 and each of the voltages appearing at terminals 22 and 23. Thus, the amplitude of each of the voltages appearing at terminals 26, 27, 28 and 29 is dependent on the relative amplitudes of the pair of control voltages applied to the corresponding leg of the bridge network.

It is deemed apparent from Equations 6 to 9 that the averages of the control voltages appearing at terminals 26, 27, 28 and 29 are linear combinations of the voltages $E_{c1}$ with the difference voltages between either upper and lower halves or right and left halves of the transducer.

Consequently, the relative amplitudes of the voltages at terminals 26 and 28 are dependent on the sense of the difference voltages between the upper and lower halves, while the relative amplitudes of the voltage appearing at terminals 27 and 29 are dependent on the sense of the difference voltages between right and left halves.

Obviously, many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. For use in underwater echo ranging apparatus comprising electro-acoustic transducer means having four separately-responsive sections symmetrically arranged in quadrantal configuration about a reference axis, wherein target echoes impinging upon said transducer sections are of substantially like magnitude but characterized by phase differences dependent upon target direction relative to a reference frame having its origin at said transducer and further defined by mutually perpendicular planes extending between said transducer sections and through said reference axis, the combination comprising: means for operating upon the target signals delivered by each of said sections to provide a quadrature voltage corresponding in magnitude to a vectorial summation of said target echoes but in phase-quadrature to said summation; means for operating upon the pair of signals delivered by a diagonal pair of said transducer sections to provide a first voltage corresponding to the vectorial difference of target echoes received by the sections of said diagonal pair, and to provide a second voltage of like magnitude but in phase-opposition to said first voltage; means for operating upon the pair of signals delivered by the remaining diagonal pair of said transducer sections to provide a third voltage corresponding to the vectorial difference of target echoes received by the sections of said remaining diagonal pair, and to provide a fourth voltage of like magnitude but in phase-opposition to said third voltage; means for providing a first control voltage corresponding to the summation of said quadrature voltage with said first and third voltages, and a second control voltage corresponding to the summation of said quadrature voltage with said first and fourth voltages, whereby said first and second control voltages have relative magnitudes corresponding to the sense of target direction referred to one of said mutually perpendicular planes; and means for providing a third control voltage corresponding to the summation of said quadrature voltage with said second and third voltages, and a fourth control voltage corresponding to the summation of said quadrature voltage with said second and fourth voltages, whereby said third and fourth control voltages have relative magnitudes corresponding to the sense of target direction referred to the other of said mutually perpendicular planes.

2. In an underwater echo ranging apparatus, in combination: electro-acoustic transducer means having a reference axis therethrough and comprising four separately-responsive sections symmetrically arranged in quadrantal configuration about said reference axis, whereby target echoes impinging upon said transducer sections are of substantially like magnitude but characterized by phase differences dependent upon target direction relative to a reference frame having its origin at said transducer and further defined by mutually perpendicular planes extending between said transducer sections and through said reference axis; means for operating upon the target signals delivered by each of said sections to provide a quadrature voltage substantially proportional to target echo intensity, corresponding in magnitude to a vectorial summation of said target echoes but in phase-quadrature to said vectorial summation; means for operating upon the pair of signals delivered by a diagonal pair of said transducer sections to provide a first voltage corresponding to the vectorial difference of target echoes received by the sections of said diagonal pair, and to provide a second voltage of like magnitude but in phase-opposition to said first voltage; means for operating upon the pair of signals delivered by the remaining diagonal pair of said transducer sections to provide a third voltage corresponding to the vectorial difference of target echoes received by the sections of said remaining diagonal pair, and to provide a fourth voltage of like magnitude but in phase-opposition to said third voltage; means for providing a first control voltage corresponding to the summation of said quadrature voltage with said first and third voltages, and a second control voltage corresponding to the summation of said quadrature voltages with said first and fourth voltages, whereby said first and second control voltages have relative magnitudes corresponding to the sense of target direction referred to one of said mutually perpendicular planes; and means for providing a third control voltage corresponding to the summation of said quadrature voltage with said second and third voltages, and a fourth control voltage corresponding to the summation of said quadrature voltage with said second and fourth voltages, whereby said third and fourth control voltages have relative magnitudes corresponding to the sense of target direction referred to the other of said mutually perpendicular planes.

References Cited in the file of this patent

UNITED STATES PATENTS

| | | |
|---|---|---|
| 2,051,032 | Eddy | Aug. 18, 1936 |
| 2,408,395 | Hays | Oct. 1, 1946 |
| 2,452,068 | Peterson | Oct. 26, 1948 |
| 2,507,915 | Lindenblad | May 16, 1950 |
| 2,524,180 | Schuck | Oct. 3, 1950 |
| 2,530,528 | Kreer | Nov. 21, 1950 |
| 2,590,574 | Robinson | Mar. 25, 1952 |
| 2,702,379 | Barton | Feb. 15, 1955 |